Sept. 6, 1949.　　　　　G. BANKO　　　　　2,481,381
OPTICAL PROJECTION VIEWER FOR MACHINE TOOLS
Filed April 25, 1946　　　　　　　　　　2 Sheets-Sheet 1

INVENTOR.
GEORGE BANKO
BY

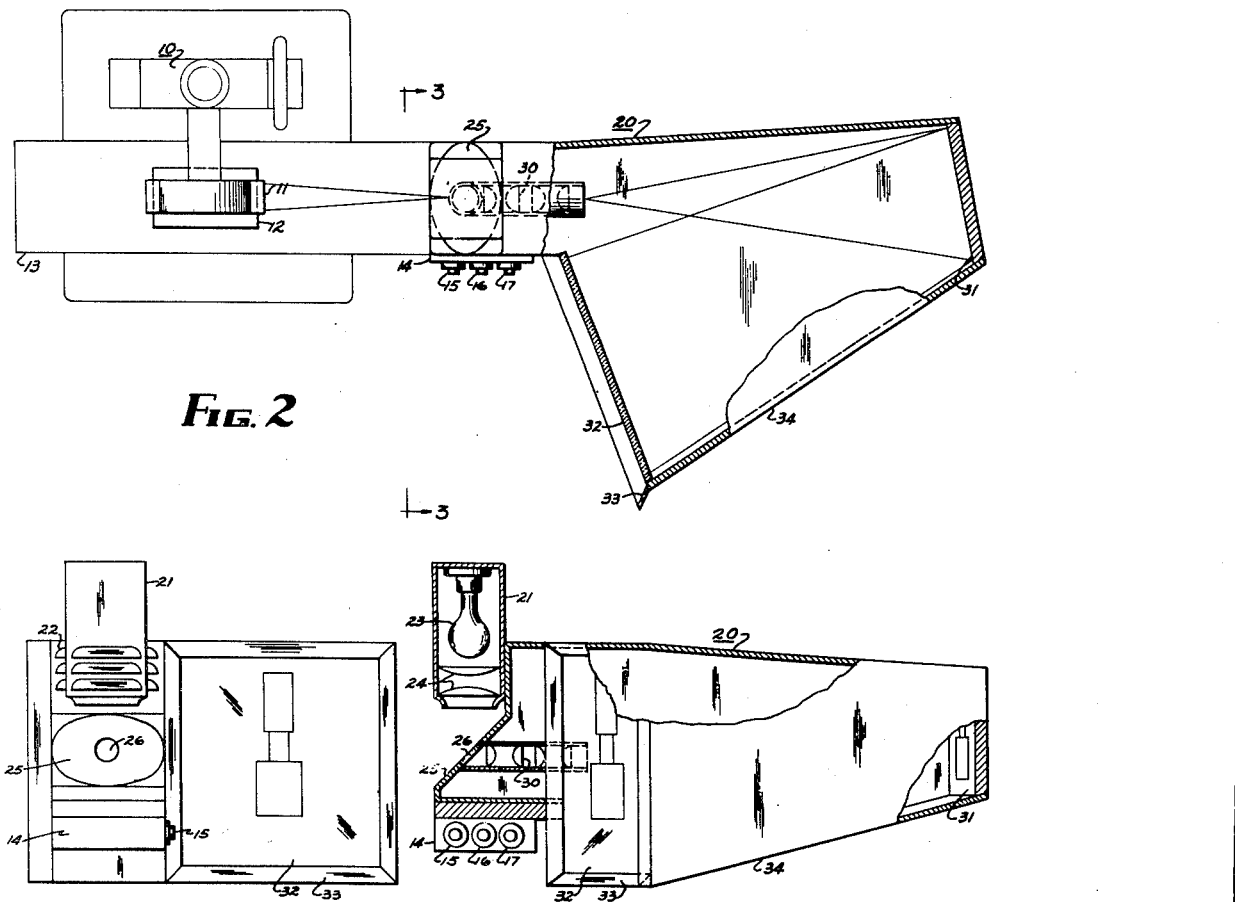

Patented Sept. 6, 1949

2,481,381

UNITED STATES PATENT OFFICE 2,481,381

OPTICAL PROJECTION VIEWER FOR MACHINE TOOLS

George Banko, Euclid, Ohio, assignor to The Cleveland Grinding Machine Company, Cleveland, Ohio, a corporation of Ohio Application April 25, 1946, Serial No. 664,921

5 Claims. (Cl. 88—24)

This invention relates to optical viewers and particularly to a viewer of the type mountable on machine tools.

The primary object of this invention is to provide a device that will enable a real image of the working area of a machine tool to be projected upon a screen while the machine is either in operation or stopped.

Conducive to a clearer understanding of this invention it may be well to point out that in many machining operations and especially in the production of precision parts, frequent inspection of the work and of the condition of the cutting edge of the tool must be made. Under ordinary circumstances this means stopping the machine, with a consequent loss of time. This constant stopping and starting increases both the possibility of unwanted tool marks being formed on the work by the tool, and the likelihood of the cutting edge of the tool being chipped if the starting and stopping is not done skillfully.

However, with the instant invention an enlarged real and shadowless image of the working area in natural colors is thrown upon a screen while the machine is either in motion or stopped, thus enabling the operator to continuously observe the condition of both the work surface and the tool. The rate of cutting and the dimensions toward which the tool is forming the work can be checked against guide lines engraved on the screen, so that the operator will know just how much material remains to be removed at all times. Furthermore, the enlarged image of the chip formed, or the spark given off, gives a continuous check on the cutting efficiency of the tool.

All of the foregoing information can be obtained while the work is being tooled thus speeding up the time needed for each operation without sacrificing the precision of the finished part.

These and other objects of the invention will become apparent from a reading of the following specification and claims, together with the accompanying drawing in which like parts are referred to and indicated by like reference characters and wherein;

Figure 2 is a top plan view of the same with parts broken away to show the relative positions of the optical system components;

Figure 3 is a view looking in the direction of the arrows 3—3 in the Figure 2; and Figure 4 is a front elevation of the device with parts broken away to show its internal structure.

Figure 1:
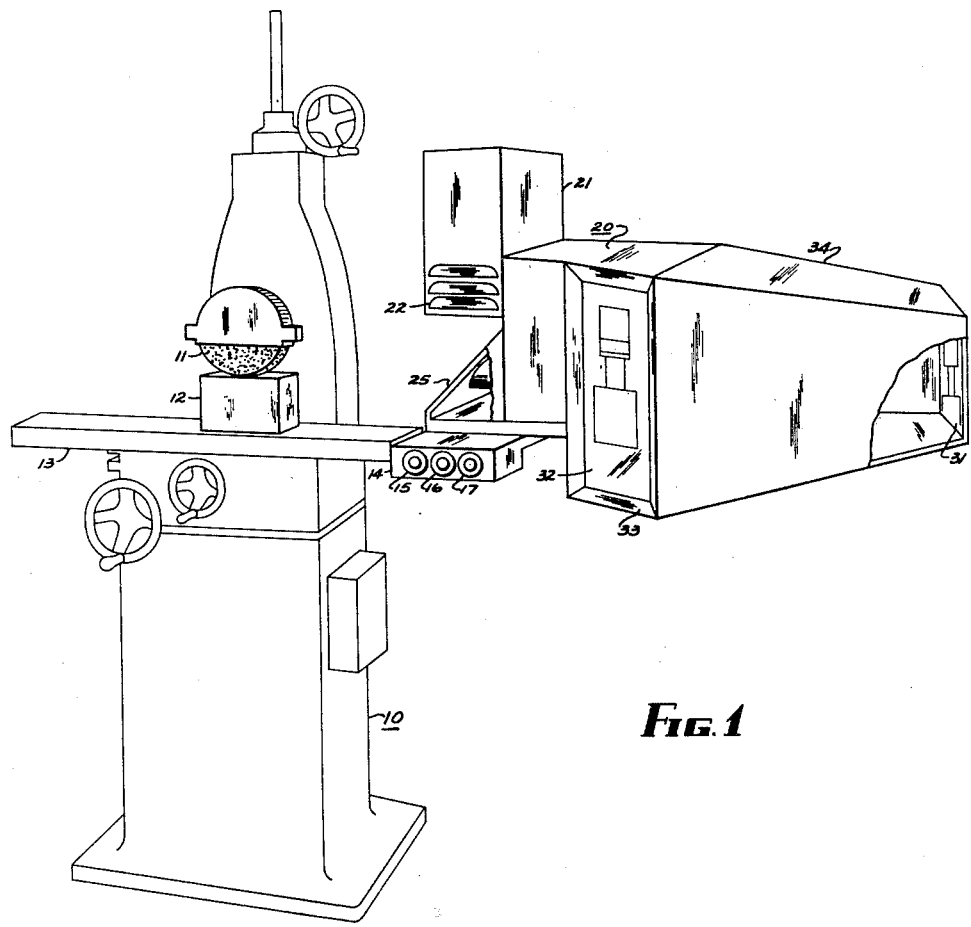
Figure 1 is a perspective view of the optical viewer combined with a conventional surface grinder.

The instant invention consists broadly of a machine tool 10, and an optical viewer 20 mounted thereon as illustrated in Figure 1.

The machine tool used for purposes of illustration in Figure 1, is a conventional surface grinder having a table 13 which holds the work 12 while it is being shaped by the grinding wheel 11, although it is to be understood that the use of this device is not to be restricted to any particular type of machine tool.

The optical viewer proper 20 may be made of any sheet material but is preferably made of sheet metal, of a gauge suitable for the purpose, and consists broadly of a light source housing 21, and an optical cabinet 34 joined together and mounted on the sub-table 14 which is slidably engaged with the table 13 as shown in Figure 1. The sub-table 14 has three handles 15, 16, and 17 connected through suitable gearing which impart transverse, longitudinal, and vertical motion respectively to the optical viewer 20 so that the projector lenses 30 can be alined with the work 12, or the tool 11, or both as desired.

The light source is of the conventional type having a housing 21, ventilating louvers 22, a 300 watt or 500 watt projection lamp 23, condensing lenses 24, and a reflector 25 set at an angle of forty-five degrees with the plane of the beam of light, thereby reflecting it through an angle of ninety degrees to evenly illuminate the work 12.

The reflector 25 may be a flat glass mirror or a highly polished metal plate and has the necessary adjusting means whereby the work or tool can be kept illuminated in all possible working positions. The light rays emanating from the light source 21, are reflected from the mirror as a columnated beam that is co-axial with the axis of the hereinafter described projector lenses 30. The viewed side of the work-piece 12 is flatly illuminated. There are no shadows, highlights or glare which might cause the real image on the screen 32 to have a stereoscopic appearance.

The reflector has a light ray orifice or opening 26 in its center large enough to allow the transmission therethrough of the image of the illuminated work 12 or tool 11 to the series of projector lenses 30. This reflector 25 is also referred to herein as a reflecting and transmitting mirror.

The optical cabinet 34 contains an optical system arranged in the manner of a camera-obscura having the projector lenses 30 mounted therein with suitable adjusting means for bringing the image into focus on the translucent screen 32. The lenses 30 are aligned with the aforestated light-ray orifice 26 in the reflecting and transmitting mirror, and the axis thereof is substantially perpendicular to the illuminated face of the work piece. The light rays forming the real image, after leaving the lens system 30, are reflected onto the screen by the mirror 31, as illustrated in the Figures 2 and 4. The interior of the cabinet is painted a flat black to avoid light reflections. The cabinet walls are extended about six inches beyond the position of the screen to form the hood 33 which serves to cut off side illumination and thus permits the image on the screen to be viewed under ordinary room lighting conditions.

The degree of magnification of the image as determined by the optical system is a simple problem of optics to one familiar with the art, and can be determined in each case to suit the conditions involved.

The screen is made of ground glass or other translucent material, and may have lines engraved or otherwise marked thereon suitable for acting as guides in determining the dimensions or shape of the work.

The size of the screen illustrated is approximately twenty-four by twenty-four inches and its position is beside the machine 10 on the same side as the operator stands as indicated in Figures 1, 2 and 3, so that the operator can manipulate the machine controls and observe the image on the screen from the same position.

The optical viewer permits inspection of the work or tool in natural colors, and in greatly enlarged form so that the operator can watch the progress of the work closely without danger of being struck by flying chips, sparks or coolant.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with an operating machine tool and a work-piece thereon, an optical system of the type by which an enlarged, flat, and shadowless real image of the work-piece and associated tool is projected on a screen, comprising a support member for the said work-piece, a viewer including a screen mounted on the machine tool on one side of the support member, a projecting lens having an axis substantially perpendicular to the viewed face of the work-piece and mounted on the machine tool between the said support member and the viewer, a reflecting and transmitting mirror mounted on the machine tool between the said support member and the projecting lens, and a light source capable of projecting a beam of light on the mirror and reflected therefrom as a columnated beam co-axial with the projecting lens axis on the work-piece and tool and transmitted therefrom through the mirror and lens to the viewer and onto the said screen, whereon the flat, shadowless, real image of the work-piece and tool is visible.

2. An optical system of the type defined in claim 1 and further characterized by having position adjusting means whereby the said lens or mirror may be moved transversely, longitudinally or vertically and aligned with, or focused on the said work-piece and associated tool.

3. In combination with an operating machine tool and a work-piece thereon, an optical system of the type by which an enlarged, flat, and shadowless real image of the work-piece and associated tool is projected on a screen, comprising, a support member for the said work-piece, a viewer including a screen mounted on the machine tool on one side of the support member, a projecting lens having an axis substantially perpendicular to the viewed face of the work-piece and mounted on the machine tool between the said support member and the viewer, a reflecting and transmitting mirror angularly mounted on the machine tool between the said support member and the projecting lens, and a light source mounted on the machine tool proximate to the said mirror and capable of projecting a beam of light thereon and reflected therefrom as a columnated beam co-axial with the projecting lens axis on the work-piece and tool and transmitted therefrom through the mirror and lens to the viewer and onto the said screen, whereon the aforesaid real image of the work-piece and tool is visible.

4. In combination with an operating machine tool and a work-piece thereon, an optical system of the type by which an enlarged, flat, and shadowless real image of the work-piece and associated tool is projected on a screen, comprising a support member for the said work-piece, a viewer including a screen mounted on the machine tool on one side of the support member, a projecting lens having an axis substantially perpendicular to the viewed face of the work-piece and mounted on the machine tool between the said support member and the viewer, a mirror mounted on the machine tool between the said support member and the projecting lens, the said mirror having a light reflecting surface and a light ray orifice therethrough, and a light source capable of projecting a beam of light on the said mirror reflecting surface and reflected therefrom as a columnated beam co-axial with the projecting lens axis on the work-piece and tool and projected therefrom through the said orifice to the viewer and onto the said screen, whereon the aforesaid real image in color of the work-piece and tool is visible.

5. In combination with an operating machine tool and a work-piece thereon, an optical system of the type by which an enlarged, flat, and shadowless real image of the work-piece and associated tool is projected on a screen, comprising, a support member for the said work-piece, a viewer including a screen mounted on the machine tool on one side of the support member, a projecting lens having an axis substantially perpendicular to the viewed face of the work-piece and mounted on the machine tool between the said support member and the viewer, a reflecting and transmitting mirror angularly mounted on the machine tool between the said support member and the projecting lens, the said mirror having a light reflecting surface and a light ray orifice therethrough, and a light source mounted on the machine tool proximate to the said mirror and capable of projecting a beam of light on the said mirror reflecting surface and reflected therefrom as a columnated beam co-axial with the projecting lens axis on the work-piece and tool and projected therefrom through the said light ray orifice to the viewer and onto the said screen, whereon the aforesaid real image in color of the work-piece and tool is visible.

GEORGE BANKO.

REFERENCES CITED

The following references are of record in the file of this patent:

UNITED STATES PATENTS

| Number | Name | Date |
|---|---|---|
| 1,433,877 | Exton | Oct. 31, 1922 |
| 1,687,946 | Massiot | Oct. 16, 1928 |
| 2,035,780 | Beardsley et al. | Mar. 31, 1936 |
| 2,109,849 | Price | Mar. 1, 1938 |
| 2,155,248 | Adams et al. | Apr. 18, 1939 |
| 2,192,529 | Thomas et al. | Mar. 5, 1940 |
| 2,197,308 | Kolb et al. | Apr. 16, 1940 |
| 2,221,154 | Soper | Nov. 12, 1940 |
| 2,261,772 | Longfellow | Nov. 4, 1941 |
| 2,360,772 | Hedin | Oct. 17, 1944 |
| 2,372,470 | Bergstrom et al. | Mar. 27, 1945 |